United States Patent
Kanasugi (10) Patent No.: US 10,322,751 B2
(45) Date of Patent: Jun. 18, 2019

(54) SUSPENSION MEMBER

(71) Applicant: TOYOTA JIDOSHA KABUSHIKI KAISHA, Toyota-shi (JP)

(72) Inventor: Hideaki Kanasugi, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 5 days.

(21) Appl. No.: 15/654,808

(22) Filed: Jul. 20, 2017

(65) Prior Publication Data

US 2018/0037263 A1    Feb. 8, 2018

(30) Foreign Application Priority Data

Aug. 4, 2016    (JP) ................................ 2016-153983

(51) Int. Cl.
    *B62D 21/11*      (2006.01)
    *B62D 29/00*      (2006.01)

(52) U.S. Cl.
    CPC ............ *B62D 21/11* (2013.01); *B62D 29/008* (2013.01); *B60G 2204/18* (2013.01)

(58) Field of Classification Search
    CPC ...... B62D 21/11; B62D 21/155; B62D 29/00; B62D 29/008
    USPC ................................... 180/312; 280/124.109
    See application file for complete search history.

(56) References Cited

U.S. PATENT DOCUMENTS 8,851,520 B2 * 10/2014 Goellner .............. B62D 21/155
    280/784
10,059,377 B2 * 8/2018 Shimizu ................. B62D 25/04
2006/0284449 A1 * 12/2006 Miyahara ............... B62D 21/11
    296/204
2007/0169982 A1   7/2007 Ogawa et al.
2018/0105213 A1 * 4/2018 Kagami ................. B62D 21/11

FOREIGN PATENT DOCUMENTS

| DE | 40 32 587 A1 | 5/1991 |
| JP | 03-045374 U1 | 4/1991 |
| JP | 05-7585 U | 2/1993 |

(Continued)

OTHER PUBLICATIONS

Japanese Decision to Grant a Patent issued in Japanese Patent Application No. 2016-153983 dated Jun. 20, 2018, citing documents AO-AT therein (w/ English Translation).

*Primary Examiner* — Faye M Fleming
(74) *Attorney, Agent, or Firm* — Oblon, McClelland, Maier & Neustadt, L.L.P.

(57) ABSTRACT

A suspension member, including a front cross member that has a rectangular closed cross-sectional shape, as seen in a cross-section orthogonal to an extension direction of the front cross member, and that is provided with an engine mount bracket at a top wall of the front cross member, is provided. The front cross member includes: a first inclined wall that, as seen in the cross-section, connects an inner surface of the top wall and an inner surface of a front wall of the front cross member, and forms a closed cross-sectional shape at an upper front corner portion of the front cross member; and a second inclined wall that, as seen in the cross-section, connects an inner surface of a bottom wall and an inner surface of a rear wall of the front cross member, and forms a closed cross-sectional shape at a lower rear corner portion.

17 Claims, 7 Drawing Sheets

(56) References Cited

FOREIGN PATENT DOCUMENTS

| | | |
|---|---|---|
| JP | 10-324268 A | 12/1998 |
| JP | 10-324272 A | 12/1998 |
| JP | 2003-154972 | 5/2003 |
| JP | 2005-289126 | 10/2005 |
| JP | 2007-050816 A | 3/2007 |
| JP | 2007-055394 A | 3/2007 |
| JP | 2015-048042 A | 3/2015 |
| WO | WO 2015/099043 A1 | 7/2015 |

* cited by examiner

SUSPENSION MEMBER

CROSS-REFERENCE TO RELATED APPLICATIONS

This application is based on and claims priority under 35 USC 119 from Japanese Patent Application No. 2016-153983 filed on Aug. 4, 2016, the disclosure of which is incorporated by reference herein.

BACKGROUND

Technical Field

The present disclosure relates to a suspension member.

Related Art

A suspension member that is formed by extrusion molding a front cross member from an aluminum alloy is conventionally known.

An example of the suspension member as described above is disclosed in Japanese Patent Application Laid-Open (JP-A) 2005-289126.

SUMMARY

This is a structure in which an engine mount bracket, which is for supporting the power unit that includes the engine, is provided at the top wall of the front cross member of the suspension member. Therefore, due to vibrations from the engine being transmitted to the front cross member, these is the concern that out-of-plane deformation in a vehicle body upward and forward direction will arise (refer to FIG. 6B).

Exemplary embodiments provide a suspension member that, even vibrations from an engine are transmitted to a front cross member, can suppress out-of-plane deformation of the front cross member toward a vehicle body upward and forward direction.

A suspension member of a first aspect comprising a front cross member that has a rectangular closed cross-sectional shape, as seen in a cross-section orthogonal to an extension direction of the front cross member, and that is provided with an engine mount bracket at a top wall of the front cross member, wherein the front cross member comprises: a first inclined wall that, as seen in the cross-section, connects an inner surface of the top wall and an inner surface of a front wall of the front cross member, and forms a closed cross-sectional shape at an upper front corner portion of the front cross member; and a second inclined wall that, as seen in the cross-section, connects an inner surface of a bottom wall and an inner surface of a rear wall of the front cross member, and forms a closed cross-sectional shape at a lower rear corner portion of the front cross member.

While the vehicle is traveling, when vibrations from the engine are transmitted to the front cross member, load that is directed toward a vehicle body upward and forward direction is inputted to the top wall of the front cross member. At this time, a linear region at which it is the most difficult for stress due to the inputted load to be applied, i.e., a neutral axis, exists at the front cross member. As seen in a cross-sectional orthogonal to the extension direction of the front cross member, this neutral axis is the form of a straight line that passes through the centroid of the front cross member and that is inclined toward the vehicle body rear upper side or the vehicle body front lower side.

Namely, as seen in a cross-section orthogonal to the extension direction of the front cross member, the upper front corner portion and the lower rear corner portion of the front cross member are regions that are further from the neutral axis than the upper rear corner portion and the lower front corner portion of the front cross member. Accordingly, the out-of-plane deformation of the upper front corner portion and the lower rear corner portion of the front cross member is greater than at the upper rear corner portion and the lower front corner portion of the front cross member. The upper front corner portion and the lower rear corner portion deform such that, for example, the angles thereof become greater than 90°.

Here, in accordance with the first aspect, as seen in a cross-section orthogonal to the extension direction of the front cross member; the front cross member has the first inclined wall, which connects the inner surface of the top wall and the inner surface of the front wall, of the front cross member and forms a closed cross-sectional shape at the upper front corner portion of the front cross member, and the second inclined wall that connects the inner surface of the bottom wall and the inner surface of the rear wall of the front cross member and forms a closed cross-sectional shape at a lower rear corner portion of the front cross member.

Accordingly, as compared with a structure in which the front cross member does not have the first inclined wall and the second inclined wall the rigidities of the upper front corner portion and the lower rear corner portion of the front cross member are improved. Accordingly, even if vibrations from the engine are transmitted to the front cross member, out-of-plan deformation of the frost cross member in a vehicle body upward and forward direction is suppressed. Note that "rectangular" in the present disclosure also includes cases in which the upper front corner portion, the upper rear corner portion, the lower front corner portion and the lower rear corner portion are formed in so-called rounded shapes as seen in the aforementioned cross-section.

A suspension member of a second aspect, wherein: the top wall has a top planar portion in which a fastening hole for fastening the engine mount bracket is formed, and a plate thickness of the top planar portion is thicker than a plate thickness of the upper front corner portion.

In accordance with the second aspect, the plate thickness of the top planar portion of the top wall in which a fastening hole is formed, for fastening the engine mount bracket, is formed to be thicker than the plane thickness of the upper front corner portion. Accordingly, even though the fastening hole is formed, the rigidity of the top planar portion of the top wall is ensured. Further, because the rigidity of the upper front corner portion is improved as described above, it is possible to form the plate thickness of the upper front corner portion to be thinner than the plate thickness of the top planar portion of the top wall, and it is possible to lighten the weight of the front cross member. Accordingly, lightening of the weight of the vehicle is devised.

A suspension member of a third aspect, wherein: the bottom wall has a bottom planar portion in which a work hole for fastening the engine mount bracket to the top planar portion is formed, and a plate thickness of the bottom planar portion is thicker than a plate thickness of the lower rear corner portion.

In accordance with the third aspect, the plate thickness of the bottom portion of the bottom wall, in which the work hole is formed for fastening the engine mount bracket to the top planar portion of the top wall, is formed to be thicker than the plate thickness of the lower rear corner portion. Accordingly, even though the work hole is formed, the rigidity of the bottom planar portion of the bottom wall is ensured. Further, because the rigidity of the lower rear corner portion is improved as described above, it is possible to form the plate thickness of the lower rear corner portion thinner than the plate thickness of the bottom planar portion of the bottom wall, and it is possible to lighten the weight of the front cross member. Accordingly, lightening of the weight of the vehicle is devised.

A suspension member of a fourth aspect, wherein the front cross member further comprises a third inclined wall that, as seen in the cross-section, connects the inner surface of the top wall and the inner surface of the rear wall, and forms a closed cross-sectional shape at an upper rear corner portion of the front cross member; and a fourth inclined wall that, as seen in the cross-section, connects the inner surface of the bottom wall and the inner surface of the front wall, and forms a closed cross-sectional shape at a lower front corner portion of the front cross member.

In accordance with the fourth aspect, the front cross member further comprises, as seen in a cross-section orthogonal to the extension direction thereof, the third inclined wall that connects the inner surface of the top wall and the inner surface of the rear wall of the front cross member and forms a closed cross-sectional shape at the upper rear corner portion of the front cross member, and the fourth inclined wall that connects the inner surface of the bottom wall and the inner surface of the front wall of the front cross member and forms a closed cross-sectional shape at the lower front corner portion of the front cross member.

Accordingly, as compared with a structure in which the front cross member does not have the third inclined wall and the fourth inclined wall, the rigidities of the upper rear corner portion and the lower front corner portion of the front cross member are improved. Namely, in accordance with the present disclosure, the rigidities of the upper front corner portion, the lower rear corner portion, the upper rear corner portion and the lower front corner portion of the front cross member are improved. Accordingly, even if, during stoppage of the vehicle, the neutral axis becomes a linear form that runs along the vehicle body longitudinal direction, the engine is supported more stably by the front cross member.

A suspension member of a fifth aspect, wherein: cross portions, which extend toward a vehicle transverse direction inner side, of front body mounts are joined to both extension direction end portions of the front cross member, and as seen in the cross-section, at least the upper front corner portion and the lower rear corner portion are covered by the cross portions.

In accordance with the fifth aspect, as seen in a cross-section orthogonal to the extension direction of the front cross member, at least the upper front corner portion and the lower rear corner portion are covered by the cross portions, which extend toward the vehicle transverse direction inner side, of front body mounts. Accordingly, the cross portions of the front body mounts out-of-plane deforming together with the front cross member is suppressed. Note that the cross portion in the present disclosure also includes shapes that continuously cover the region from the upper front corner portion to the lower rear corner portion as seen in the aforementioned cross-section.

A suspension member of a sixth aspect, wherein upper front joined portions of the cross portions that are joined to an outer surface of the front wall overlap, in a vehicle body vertical direction, with an upper front connected portion of the first inclined wall that is connected to the inner surface of the front wall.

In accordance with the sixth aspect, the upper front joined portions of the cross portions, which are joined to the outer surface of the front wall of the front cross member, overlap, in the vehicle body vertical direction, with the upper front connected portion of the first inclined wall that is connected to the inner surface of the front wall of the front cross member. Here, as described above, the rigidity of the upper front corner portion is improved by the first inclined wall. Namely, the upper front connected portion of the first inclined wall is a region of high rigidity.

Accordingly, as compared with a structure in which the upper front joined portions of the cross portions do not overlap with the upper front connected portion of the first inclined wall in the vehicle body vertical direction, at the time when vibrations from the engine are transmitted to the front cross member, the upper front joined portions of the cross portions separating from the outer surface of the front wall of the front cross member is suppressed. Note that "overlap" in the present disclosure means that at least a portion of the upper front joined portion exists within the region, in the vehicle body vertical direction of the upper front connected portion.

A suspension member of a seventh aspect, wherein lower rear joined portions of the cross portions that are joined to an outer surface of the rear wall overlap, in a vehicle body vertical direction, with a lower rear connected portion of the second inclined wall that is connected to the inner surface of the rear wall.

In accordance with the seventh aspect, the lower rear joined portions of the cross portions, which are joined to the outer surface of the rear wall of the front cross member, overlap, in the vehicle body vertical direction, with the lower rear connected portion of the second inclined wall that is connected to the inner surface of the rear wall of the front cross member. Here, as described above, the rigidity of the lower rear corner portion is improved by the second inclined wall. Namely, the lower rear connected portion of the second inclined wall is a region of high rigidity.

Accordingly, as compared with a structure in which the lower rear joined portions of the cross portions do not overlap with the lower rear connected portion of the second inclined wall in the vehicle body vertical direction, at the time when vibrations from the engine are transmitted to the front cross member, the lower rear joined portions of the cross portions separating from the outer surface of the rear wall of the front cross member is suppressed. Note that "overlap" in the present disclosure means that at least a portion of the lower rear joined portion exists within the region, in the vehicle body vertical direction, of the lower rear connected portion.

In accordance with the first aspect, even if vibrations from the engine are transmitted to the front cross member, the front cross member out-of-plane deforming toward a vehicle body upward and forward direction can be suppressed.

In accordance with the second aspect and the third aspect, the weight of the front cross member can be lightened, and, as a result, the weight of the vehicle can be lightened.

In accordance with the fourth aspect, the engine can be supported more stably at the front cross member.

In accordance with the fifth aspect, the cross portions of the front body mounts out-of-plane deforming together with the front cross member can be suppressed.

In accordance with the sixth aspect, at the time when vibrations from the engine are transmitted to the front cross member, the upper front joined portions of the cross portions of the front body mounts separating from the outer surface of the front wall of the front cross member can be suppressed.

In accordance with the seventh aspect, at the time when vibrations from the engine are transmitted to the front cross member, the lower rear joined portions of the cross portions of the front body mounts separating from the outer surface of the rear wall of the front cross member can be suppressed.

DETAILED DESCRIPTION

Embodiments relating to the present disclosure are described hereinafter in detail on the basis of the drawings. Note that, for convenience of explanation, arrow UP that is shown appropriately in the respective drawings indicates the vehicle body upward direction, arrow FR indicates the vehicle body forward direction, and arrow RH indicates the vehicle body rightward direction. Further, in the following description, when vertical, longitudinal and left-right directions are used without being specified, they refer to the vertical of the vehicle body vertical direction, the longitudinal of the vehicle body longitudinal direction, and the left and right of the vehicle body left-right direction, i.e., the vehicle transverse direction.

FIRST EMBODIMENT

First, a suspension member 12 relating to a first embodiment is described. The suspension member 12 shown in FIG. 1 through FIG. 3 is supported at the lower sides of the front portions of a pair of left and right front side members (not shown) that extend along the vehicle body longitudinal direction, in a state of hanging down from these front side members.

The respective front side members have kick portions that that make the vehicle body front portion sides thereof be positioned higher than the vehicle body rear portion sides thereof. Accordingly, mount portions 24 of a pair of left and right front body mounts 22, which are described later and which are the front end portion of the suspension member 12, are mounted to the front end portions of the front side members at further toward the vehicle body from side than the kick portions. A pair of left and right fastening portions 46 of a rear cross member 49, which is described later and is the rear end portion of the suspension member 12, are mounted to the lower end portions of the kick portions.

Figure 1:
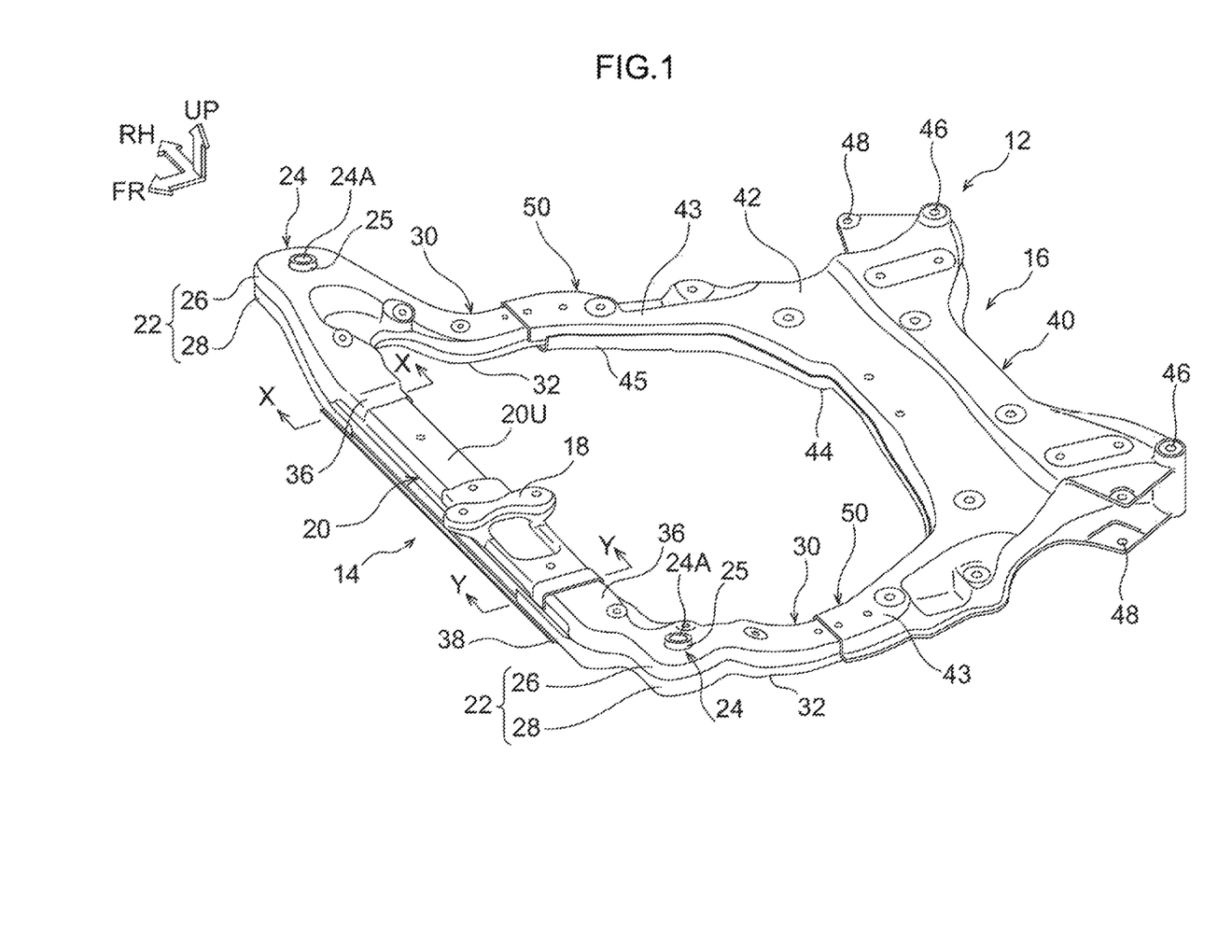
FIG. 1 is a perspective view showing a suspension member relating to a first embodiment as seen from an upper side.
Figure 2:
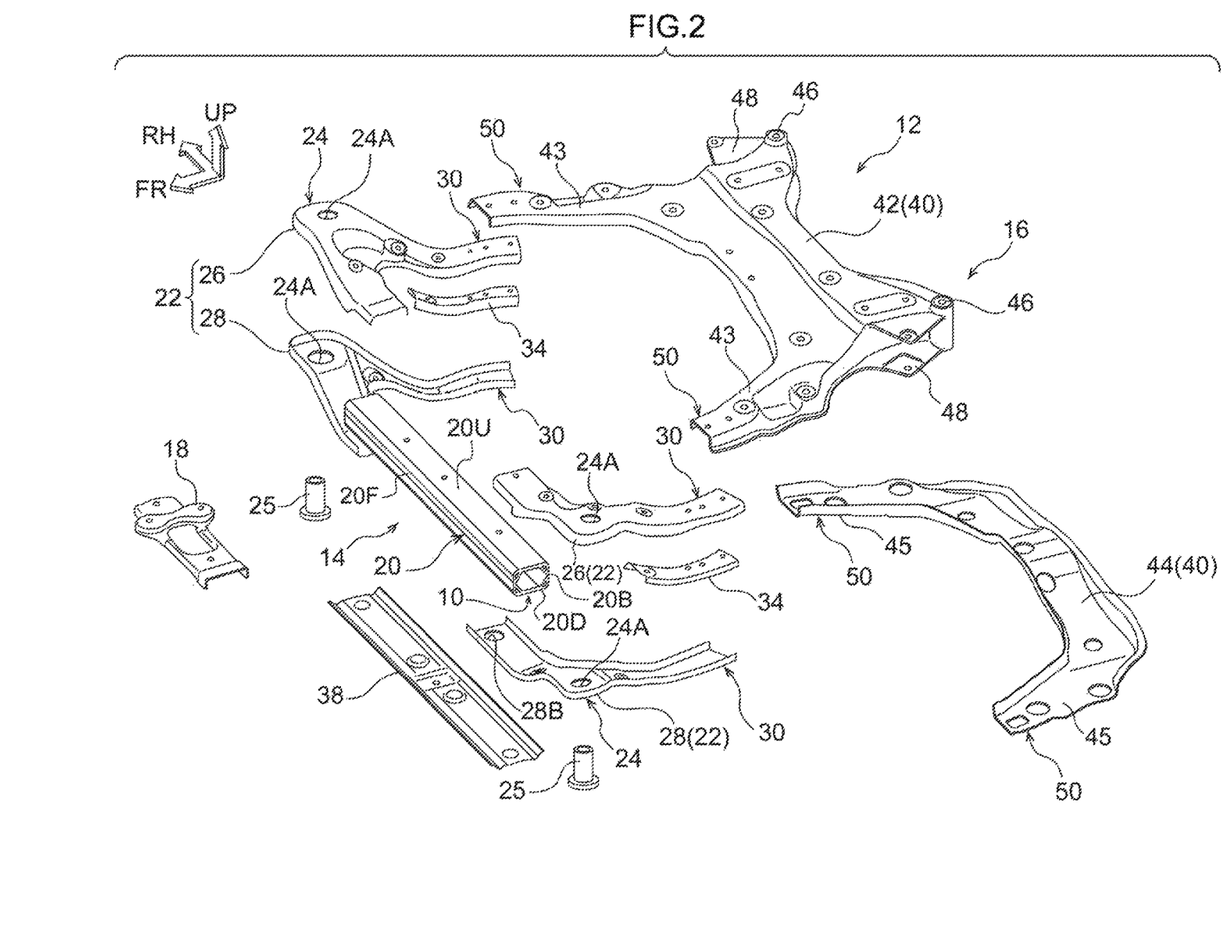
FIG. 2 is an exploded perspective view showing the suspension member relating to the first embodiment as seen from the upper side.
Figure 3:
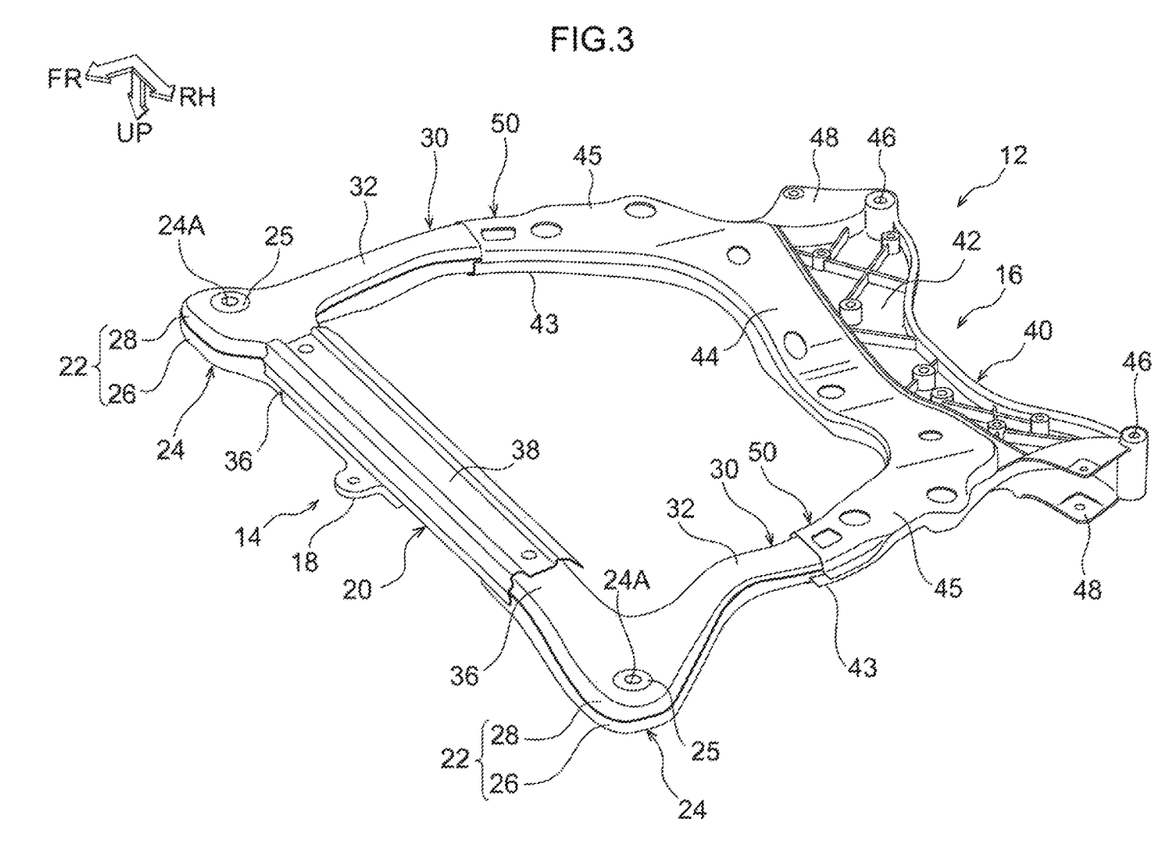
FIG. 3 is a perspective view showing the suspension member relating to the first embodiment as seen from a lower side

As shown in FIG. 1 through FIG. 3, the suspension member 12 has a front frame 14 that is substantially "U" shaped is plan view, and a rear frame 16 that is substantially "U" shaped in plan view and that is joined to the vehicle body side of the front frame 14. The front frame 14 has a front cross member 20 that extends in the vehicle transverse direction, and the pair of left and right front body mounts 22 that are provided at the length direction, i.e., vehicle transverse direction, both end portions of the front cross member 20.

The front cross member 20 is formed in a predetermined rectangular, closed cross-sectional shape as seen in a cross-section orthogonal to the length direction, i.e., the vehicle transverse direction, by extrusion molding of a light metal material such as an aluminum alloy or the like. The respective front body mounts 22 are formed in substantial "L" shapes in plan view by press molding of a light metal material such as an aluminum alloy or the like, and are structured to include upper mounts 26 that have open cross-sectional shapes and whose vehicle body lower sides are open, and lower mounts 28 that have open cross-sectional shapes and whose vehicle body upper sides are open.

The respective corner portions of the pair of left and right front body mounts 22 are the mount portions 24 that are supported at the front end portions of the respective front side members. Through-holes 24A that pass through in the vertical direction are formed in the respective mount portions 24. Note that collar members 25 (see FIG. 2) that are cylindrical are inserted into the respective through-holes 24A from the vehicle body lower side and are mounted thereto.

Further, the portions of the respective front body mounts 22, which portions are further toward the vehicle transverse direction inner side than the mount portions 24, are cross portions 36 that have rectangular closed cross-sectional shapes and extend toward the vehicle transverse direction inner side. As is described later, the respective cross portions 36 cover the vehicle transverse direction both end portions of the front cross member 20, and are joined in linear forms by arc welding to these vehicle transverse direction both end portions (see FIG. 4). For example, the vehicle transverse direction both end portions of the front cross member 20 are inserted into the respective cross portions 36.

Further, an engine mount bracket 18, which is formed to a length that is shorter than the front cross member 20, is joined by fastening by bolts and by arc welding at a region that is further toward the left end portion side than the length direction (i.e., extension direction) substantially central portion of a top wall 20U of the front cross member 20. Namely there is a structure in which a power unit (not illustrated) that includes the engine and the transmission is disposed at the vehicle body upper side of the suspension member 12, and the power unit is supported from the vehicle body lower side by at least the suspension member 12 and the like.

Further, a cross plate 38, which is formed to substantially the same length as the front cross member 20, is joined by fastening by bolts or welding or the like to a bottom wall 20D of the front cross member 20. This is a structure in which the entire bottom wall 20D of the front cross member 20 is protected by the cross plate 38.

Note that the engine mount bracket 18 is formed in an open cross-sectional shape whose vehicle body lower side is open, by die casting of a light metal material such as an aluminum alloy or like. The cross plate is formed in an open cross-sectional shape whose vehicle body upper side is open, by press molding of a light metal material, such as an aluminum alloy or the like. Further, a cross-sectional structure 10 of the front cross member 20 is described in detail later.

Portions, which are further toward the vehicle body rear side than the mount portions 24, of the respective front body mounts 22 are a pair of left and right front side rail portions 30 that extend in the vehicle body longitudinal direction. The respective front side rail portions 30 are formed in rectangular, closed cross-sectional shapes as seen in a cross-section that is orthogonal to the extension direction thereof. Bent portions 32, which are convex toward the vehicle body lower side (i.e., downwardly convex) in a side view seen from the vehicle transverse direction, are formed at the substantially central portions in the extension direction, of the respective front side rail portions 30 (i.e., the vehicle body longitudinal direction).

Further, reinforcing rail portions 34 (see FIG. 2) that extend in the vehicle body longitudinal direction are provided between the front side rail portions 30 of the upper mounts and the front side rail portions of the lower mounts 28. The reinforcing rail portions 34 are formed in open cross-sectional shapes whose vehicle body lower sides are open, by press molding of a light metal material such as an aluminum alloy or the like, and extend to the rear end portions of the front side rail portions 30 so as to reinforce the regions from the bent portions 32 to the rear end portions of the front side rail portions 30.

The rear frame 16 has the rear cross member 40 that extends in the vehicle transverse direction. The rear cross member 40 is structured to include an upper member 42, and a lower member 44 that is provided at the bottom surface side of the upper member 42 and protects this bottom surface side. The upper member 42 is formed in an open cross-sectional shape whose vehicle body lower side is open, by die casting of a light metal material such as an aluminum alloy or the like. The lower member 44 is formed in an open cross-sectional shape whose vehicle body upper side is open, by press molding of a light metal material such as an aluminum alloy or the like.

Fastening portions 46, which are for mounting to the lower end portions of the kick portions of the respective front side members, are formed at the rear portions of the vehicle transverse direction both ends of the upper member 42. Lower arm mounting portions 48, which are for mounting lower arms (not illustrated) that structure suspension arms (not illustrated), are formed at the vehicle transverse direction both end portions of the upper member 42, further toward the vehicle body front side than the fastening portions 46.

Further, a pair of left and right upper rail portions that extend toward the vehicle body front side are formed integrally with the front portions of the vehicle transverse direction both ends of the upper member 42. A pair of left and right lower rail portions 45 that extend toward the vehicle body front side are formed integrally with the front portions of the vehicle transverse direction both ends of the lower member 44. A pair of left and right rear side rail portions 50, which are formed in rectangular, closed cross-sectional shapes as seen in a cross-section orthogonal to the extension direction, are structured due to the left and right side surfaces of the respective upper rail portions 43 and the left and right side surfaces of the respective lower rail portions 45 being joined together in linear forms by arc welding.

Further, the front portions of the respective rear side rail, portions 50 cover the rear portions of the respective front side rail portions 30. For example, the rear portions of the respective front side rail portions 30 are inserted into the respective rear side rail portions 50. The side edge portions at the front portions of the respective rear side rail portions 50 are formed in linear forms by arc welding to the wall surfaces (i.e., the top surface, the bottom surface, and the left and right side surfaces) of the rear portions of the respective front side rail portions 30 that are superposed with these side edge portion.

Namely, the respective rear side rail portions 50 extend along the respective front side rail portions 30. The side edge portions at the front portions of the upper rail portions 43 are arc-welded to the top surface and the left and right side surfaces at the rear portions of the upper mounts 26 that structure the front side rail portions 30. The side edge portions at the front portions of the lower rail portions are arc-welded to the bottom surface and the left and right side surfaces at the rear portions of the lower mounts that structure the front side rail portions 30.

In this way, due to the front side rail portions 30 and the rear side rail portions 50 being joined at joined portions by arc welding, the suspension member 12 is formed at which the front frame 14 and the rear frame 16 are joined integrally, and the front side rail portions 30 and the rear side rail portions 50 extend in continuation in the vehicle body longitudinal direction, and the front cross member 20 and the rear cross-member 40 respectively extend in the vehicle transverse direction.

Figure 4:
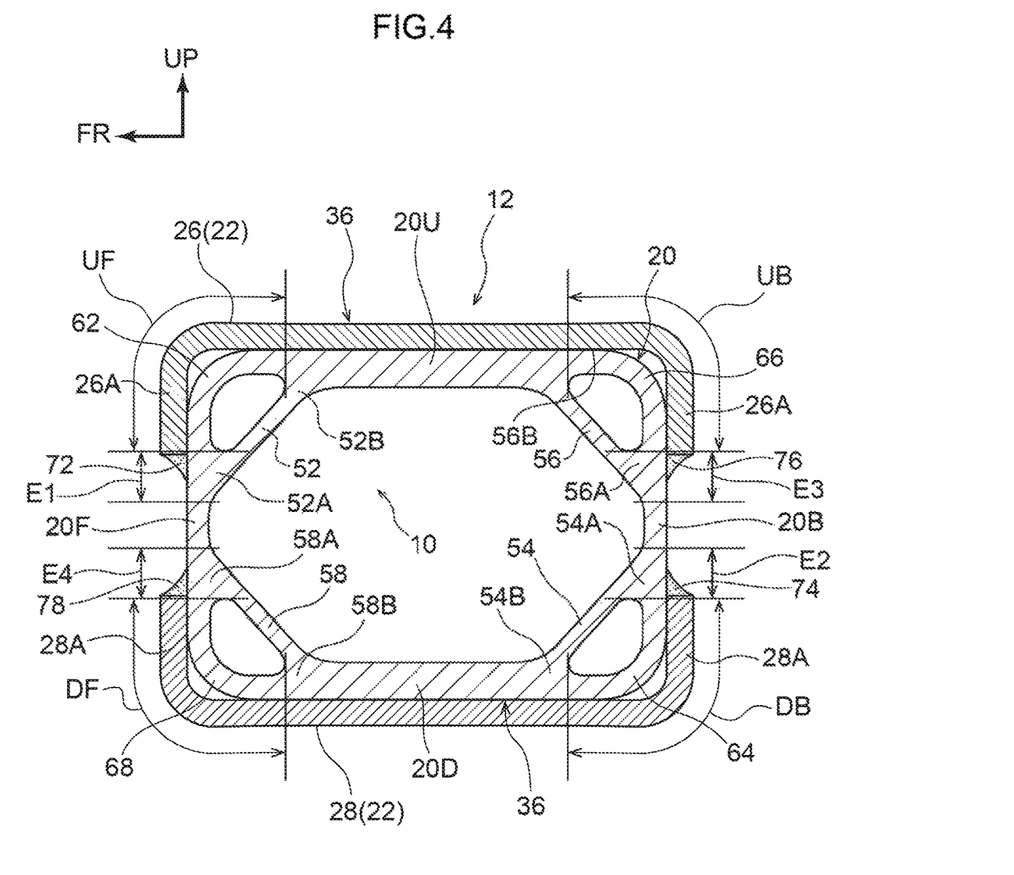
FIG. 4 is a cross-sectional view seen in the direction of the X-X arrow in FIG. 1.
Figure 5:
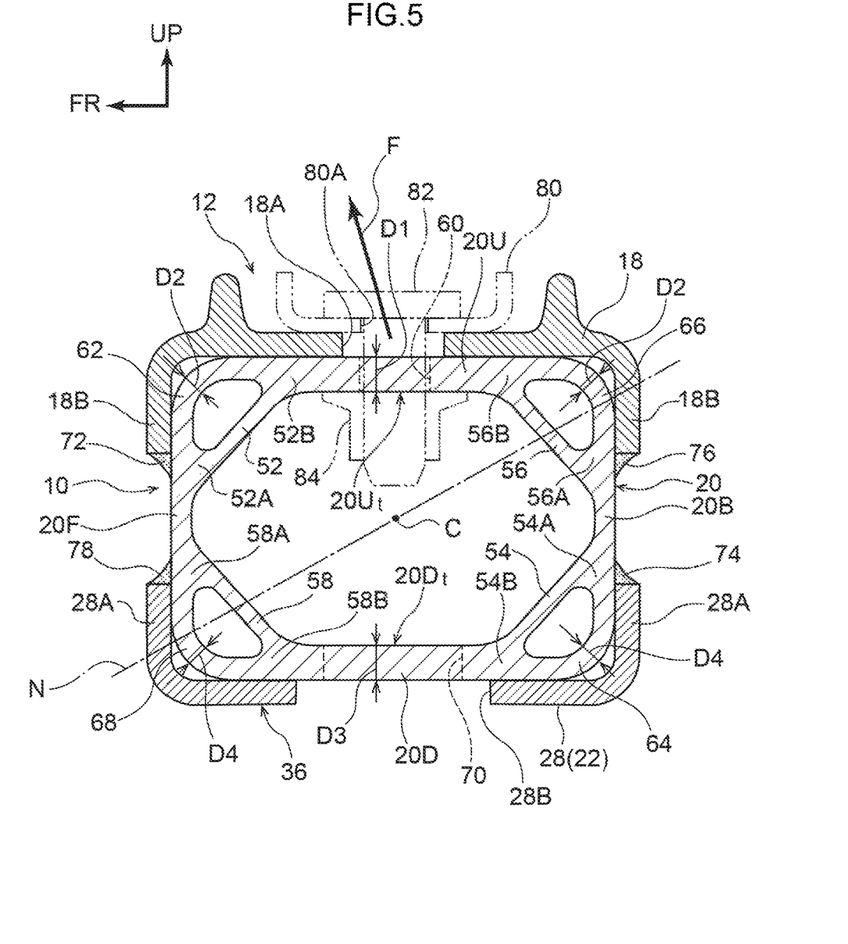
FIG. 5 is a cross-sectional view seen in the direction of the Y-Y arrow in FIG. 1.

Next, the cross-sectional structure 10 of the front cross member 20 is described in detail on the basis of FIG. 4 and FIG. 5. Note that the cross plate 38 is omitted from FIG. 4 through FIG. 7.

As shown in FIG. 4 and FIG. 5, as seen in a cross-section orthogonal to the extension direction of the front cross member 20 (i.e., the vehicle transverse direction), the front cross member 20 has a first inclined wall 52, which connects the inner surface of the top wall 20U and the inner surface of a front wall 20F and forms a closed cross-sectional shape at an upper front corner portion 62, and a second inclined wall 54, which connects the inner surface of the bottom wall 20D and the inner surface of a rear wall 20B and forms a closed cross-sectional shape at a lower rear corner portion 64.

Moreover, as seen in a cross-section orthogonal to the extension direction of the front cross member 20 (i.e., the vehicle transverse direction), the front cross member 20 has a third inclined wall 56, which connects the inner surface of the top wall 20U and the inner surface of the rear wall 20B and forms a closed cross-sectional shape at an upper rear corner portion 66, and a fourth inclined wall 58, which connects the inner surface of the bottom wall 20D and the inner surface of the front wall 20F and forms a closed cross-sectional shape at a lower front corner portion 68.

Note that the upper front corner portion 62 indicates the range from the upper end portion of a competed portion (hereinafter called "upper front connected portion") 52A of the first inclined wall 52 and the front wall 20F to the left end portion of a connected portion 52B of the first inclined wall 52 and the top wall 20U (the range shown by arrow UF in FIG. 4). Further, the lower rear corner portion 64 indicates the range from the lower end portion of a connected portion (hereinafter called "lower rear connected portion") 54A of the second inclined wall 54 and the rear wall to the right end portion of a connected portion 54B of the second inclined wall 54 and the bottom wall 20D (the range shown by arrow DB in FIG. 4).

Further, the upper rear corner portion 66 indicates the range from the upper end portion of a connected portion (hereinafter called "upper rear connected portion") 56A of the third inclined wall 56 and the rear wall 20B to the right end portion of a connected portion 56B of the third inclined wall and the top wall 20U (the range shown by arrow UB in FIG. 4). Further, the lower front corner portion indicates the range from the lower end portion of a connected portion (hereinafter called "lower front connected portion") 58A of the fourth inclined wall and the front wall 20F to the left end portion of a connected portion 58B of the fourth inclined wall 58 and the bottom wall 20D (the range shown by arrow DF in FIG. 4).

As shown in FIG. 4, the upper front corner portion 62, the upper rear corner portion 66, the lower rear corner portion 64 and the lower front corner portion 68 at the both end portion sides of the front cross member 20 are covered by vehicle body longitudinal direction both end portions 26A, 28A, which are bent toward the vehicle body lower side and the vehicle body upper side, of the cross portions 36 at the upper mount 26 and the lower mount 28 of the front body mounts 22.

In further detail, the vehicle body longitudinal direction both end portions 26A, which are bent toward the vehicle body lower side, of the cross portions 36 at the upper mounts 26 of the front body mounts 22 respectively cover the upper front corner portion 62 and the upper rear corner portion 66. The vehicle body longitudinal direction both end portions 28A, which are bent toward the vehicle body upper side, of the cross portions 36 at the lower mounts 28 of the front body mounts 22 respectively cover the lower rear corner portion 64 and the lower front corner portion 68.

Further, the lower side edge portions of the vehicle body longitudinal direction both end portions 26A at the cross portions 36 of the upper mounts 26 and the upper side edge portions of the vehicle body longitudinal direction both end portions 28A at the cross portions 36 of the lower mounts 28, which are superposed on the outer surface of the front wall 20F and the outer surface of the rear wall 208 of the front cross member 20, are joined in linear forms by arc welding to the outer surface of the front wall 20F and the outer surface of the rear wall 20B of the front cross member 20, respectively.

Note that the vehicle transverse direction inner side edge portions at the cross portions 36 of the upper mounts 26 also are superposed on the outer surface of the top wall 20U, the outer surface of the front wall 20F and the outer surface of the rear wall 20B of the front cross member 20, and are joined thereto in linear forms by arc welding. Further, the vehicle transverse direction inner side edge portions at the cross portions of the lower mounts 28 as well are superposed on the outer surface of the bottom wall 20D, the outer surface of the front wall 20F and the outer surface of the rear wall 20B of the front cross member 20, and are joined thereto in linear forms by arc welding.

Upper front joined portions 72, which are joined by arc welding, of the cross portions 36 of the upper mounts 26 that are joined to the outer surface of the front wall 20F of the front cross member 20 overlap, in the vehicle body vertical direction, with the upper front connected portion 52A of the first inclined wall 52 that is connected to the inner surface of the front wall 20F. In other words, the upper front joined portions 72 are disposed at positions that are at substantially the same height as the upper front connected portion 52A, such that at least a portion of the upper front joined portions 72 exists within a region E1 in the vehicle body vertical direction of the upper front connected portion 52A shown in FIG. 4.

Further, upper rear joined portions 76, which are joined by arc welding, of the cross portions 36 of the upper mounts 26 that are joined to the outer surface of the rear wall 20B of the front cross member 20 overlap, is the vehicle body vertical direction, with the upper rear connected portion 56A of the third inclined wall 56 that is connected to the inner surface of the rear wall 20B. In other words, the upper rear joined portions 76 are disposed at positions that are at substantially the same height as the upper rear connected portion 56A, such that at least a portion of the upper rear joined portions 76 exists within a region E3 in the vehicle body vertical direction of the upper rear connected portion 56A shown in FIG. 4.

Moreover, lower rear joined portions 74, which are joined by arc welding, of the cross portions 36 of the lower mounts 28 that are joined to the outer surface of the rear wall 20B of the front cross member 20 overlap, in the vehicle body vertical direction, with the lower rear connected portion 54A of the second inclined wall 54 that is connected to the inner surface of that rear wall 20B. In other words, the lower rear joined portions 74 are disposed at positions that are at substantially the same height as the lower rear connected portion 54A, such that at least a portion of the lower rear joined portions 74 exists within a region E2 in the vehicle body vertical direction of the lower rear connected portion 34A shown in FIG. 4.

Lower front joined portions 78, which are joined by arc welding, of the cross portions 36 of the lower mounts 28 that are joined to the outer surface of the front wall 20F of the front cross member 20 overlap, in the vehicle body vertical direction, with the lower front connected portion 58A of the fourth inclined wall 58 that is connected to the inner surface of that front wall 20F. In other words, the lower front joined portions 78 are disposed at positions that are at substantially the same height as the lower front connected portion 58A, such that at least a portion of the lower front joined portions 78 exists within a region E4 in the vehicle body vertical direction of the lower front connected portion 58A shown in FIG. 4.

As shown in FIG. 5, the top wall 20U of the front cross member 20 has a top planar portion 20Ut in which a fastening hole 60 is formed that is a bolt insertion hole for fastening the engine mount bracket 18 and an engine mount 80 by a bolt 82 and a nut 84. Further, plate thickness D1 of the top planar portion 20Ut is formed to be thicker than plate thickness of the upper front corner portion 62 and the upper rear corner portion 66. Note that bolt insertion holes 18A, 80A are formed in the engine mount bracket 18 and the engine mount 80 as well.

Further, as shown in FIG. 1, the left end portion of the engine mount bracket 18 covers the vehicle transverse direction inner side end portion of the cross portion 36 of the upper mount 26 that is at the left side. Accordingly, as shown in FIG. 5, the upper front corner portion 62 and the upper rear corner portion 66, which are in the region front the length direction (i.e., extension direction) substantially central portion of the front cross member 20 to the cross portion 36 of the upper mount 26 that is at the left side, are respectively covered by vehicle body longitudinal direction both end portions 18B, which are bent toward the vehicle body lower side, of the engine mount bracket 18.

Further, the lower side edge portions of the vehicle body longitudinal direction both end portions 18B of the engine mount bracket 18, which are superposed on the outer surface of the front wall 20F and the outer surface of the rear wall 20B of the front cross member 20, are joined in linear forms by arc welding to the outer surface of the front wall 20F and the outer surface of the rear wall 20B of the front cross member 20, respectively.

Note that the upper front joined portion 72, which is joined by arc welding, of the engine mount bracket 18 that is joined to the outer surface of the front wall 20F of the front cross member 20 also overlaps, in the vehicle body vertical direction, with the upper front connected portion 52A of the first inclined wall 52. The upper rear joined portion 76, which is joined by arc welding, of the engine mount bracket 18 that is joined to the outer surface of the rear wall 20B of the front cross member 20 also overlap, in the vehicle body vertical direction, with the upper rear connected portion 56A of the third inclined wall 56.

Further, the cross portion 36 of the lower mount that is at the left side extends further toward the vehicle transverse direction inner side than the cross portion 36 of the upper mount 26 that is at the left side, and faces the engine mount bracket 18 in the vehicle body vertical direction. Accordingly, in FIG. 5, the engine mount bracket 18 is shown at the upper portion side of the front cross member 20, and the cross portion 30 of the lower mount 28 is shown at the lower portion side of the front cross member 20.

Further, the bottom wall 20D of the front cross member 20 has a bottom planar portion 20Dt in which a work hole 70 is formed for insertion of a tool (not illustrated) that holds the nut 84, in order to fasten the engine mount bracket 18 and the engine mount 80 to the top planar portion 20Ut by the bolt 82 and the nut 84. Plate thickness D3 of the bottom planar portion 20Dt is formed to be thicker than plate thickness D4 of the lower rear corner portion 64 and the lower front corner portion 68.

Note that, at the front cross member 20 that is illustrated, plate thickness D1=plate thickness D3, and plate thickness D2=plate thickness D4, but the present disclosure is not limited to this. Further, the plate thicknesses of the first inclined wall 52, the second inclined wall 54, the third inclined wall 56 and the fourth inclined wall 58 that are illustrated are formed to be thinner than the plate thickness D2 and the plate thickness D4, but the present disclosure is not limited to this. Moreover, a through-hole 28B (refer to FIG. 2 as well) for exposing the work hole 70 is formed in the cross portion 36 at the lower mount 28 that is at the left side.

Operation of the suspension member 12, which relates to the first embodiment and is structured as described above, is described next.

As shown in FIG. 1, the engine mount bracket 18 is provided at the left end portion side from the length direction (i.e., extension direction) substantially central portion of the top wall 20U of the front cross member 20. Further, as shown in FIG. 5, the engine mount 80 is mounted to this engine mount bracket 18.

Namely, the bolt 82 is inserted from the vehicle body upper side into the bolt insertion holes 80A, 18A that are formed in the engine mount 80 and the engine mount bracket 18, and into the fastening hole 60 that is formed in the top planar portion 20Ut of the top wall 20U, and the bolt 82 is screwed together with the nut 84 that is held so as to be unable to route by a tool (not shown) that is inserted from the work hole 70 formed in the bottom planar portion 20Dt of the bottom wall 20D. Due thereto, the engine mount 80 is fixed together with the engine mount bracket 18 to the top wall 20U.

Figure 6A:
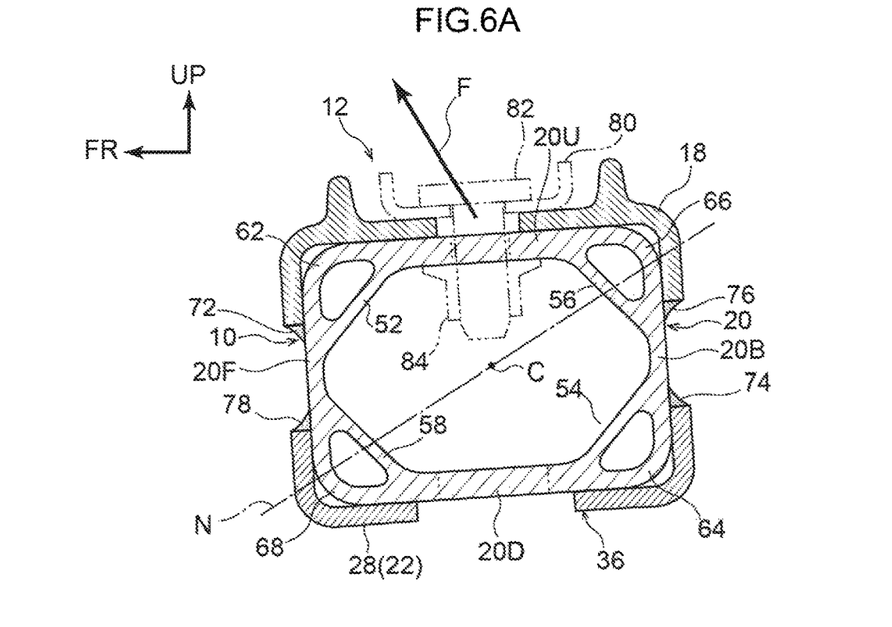
FIG. 6A is a cross-sectional view showing a deformed state of a front cross member relating to the first embodiment.
Figure 6B:
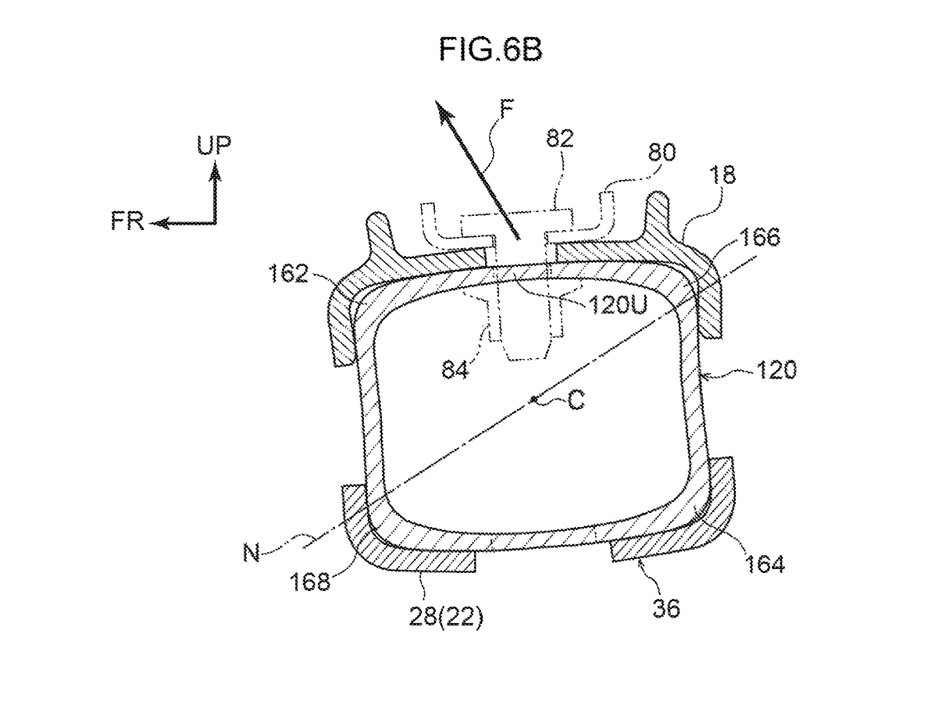
FIG. 6B is a cross-sectional view showing a deformed state of a front cross member relating to a comparative example.

Accordingly, while the vehicle is traveling, load F (refer to FIG. 5 and FIG. 6) that is directed toward a vehicle body upward and forward direction is inputted to at least the length direction (i.e., extension direction) substantially central portion of the top wall 20U of the front cross member 20, due to vibrations from the power unit (the power unit includes the engine) being transmitted via the engine mount 80 and the engine mount bracket 18.

Here, as shown in FIG. 6B, in the case of a front cross member 120 that relates to a comparative example and at which the first inclined wall 52, the second inclined wall 54, the third inclined wall 56 and the fourth inclined wall are not formed, and an upper front corner portion 162 and a lower rear corner portion 164 in particular deform greatly. For example, the upper front corner portion 162 and the lower rear corner portion 164 deform such that the angles of the upper front corner portion 162 and the lower rear corner portion 164 become greater than 90°. This is due to the following reason.

As shown in FIG. 6B, at the time when the load F is inputted to a top wall 120U of the front cross member 120, a linear region at which it is the most difficult for stress due to the inputted load F to be applied, i.e., a neutral axis N, exists at the front cross member 120. As seen in a cross-sectional orthogonal to the extension direction of the front cross member 120, the neutral axis N in this case is the form of a straight line that passes through centroid C of the front cross member 130 and that is inclined toward the vehicle body rear upper side or the vehicle body front lower side.

Accordingly, the upper front corner portion 162 and the lower rear corner portion 164 of the front cross member 120 are regions that are far from the neutral axis N, as compared with an upper rear corner portion 166 and a lower front corner portion 168. Therefore, the out-of-plane deformation at the upper front corner portion 162 and the lower rear corner portion 164 of the front cross member 120 is greater than at the upper rear corner portion 166 and the lower front corner portion 168.

However, as shown in FIG. 4 through FIG. 6A, as seen in a cross-section orthogonal to the extension direction of the front cross member 20 relating to the first embodiment, the front cross member 20 has the first inclined wall 52, which connects the inner surface of the top wall 20U and the inner surface of the front wall 20F and forms a closed cross-sectional shape at the upper front corner portion 62, and the second inclined wall 54, which connects the inner surface of the bottom wall 20D and the inner surface of the rear wall 20B and forms a closed cross-sectional shape at the lower rear corner portion 64.

Accordingly, as compared with a structure in which the front cross member 20 does not have the first inclined wall 52 and the second inclined wall 54, the rigidities of the upper front corner portion 62 and the lower rear corner portion 64 of the front cross member 20 can be improved. Accordingly even if the load F that is directed toward a vehicle body upward and forward direction is inputted to at least the length direction (i.e., extension direction) substantially central portion of the top wall 20U of the front cross member 20, the front cross member 20 out-of-plane deforming in a vehicle body upward and forward direction can be suppressed.

Note that, at the front cross member 120 that is shown in FIG. 6B, the rigidity can be improved if the cross-sectional shape thereof is made to be large. However, in this case, the placement of peripheral parts of the front cross member 120 becomes difficult. Further, although the rigidity can be improved if the plate thickness of the front cross member 120 is made to be large, the advantage of lightening the weight of the vehicle due to usage of a light metal material such as an aluminum alloy or the like at the front cross member 120 is lost.

In accordance with the front cross member relating to the first embodiment and shown in FIG. 4 through FIG. 6A, the rigidity (for example, the section modulus) of the front cross member 20 can be improved efficiently merely by a change in the cross-sectional shape that is the provision of the first inclined wall 52 and the second inclined wall 54. The change in the cross-sectional shape can be accomplished by further provision of the third inclined wall 56 and the fourth inclined wall 58. Accordingly, an increase in weight caused by an increase in the plate thickness of the front cross member 20 can be prevented, and changes to the placement of the peripheral parts, and the like, also can be rendered unnecessary.

Further, as shown in FIG. 4, the upper front corner portion 62, the upper rear corner portion 66, the lower rear corner portion 64 and the lower front corner portion 68, which are at the both end portion sides of the front cross member 20, are covered by the cross portions 36 of the front body mounts 22. Due to out-of-plane deformation of the front cross member 20 toward a vehicle body upward and forward direction being suppressed, the cross portions 36 of the front body mounts 22 out-of-plane deforming together with the front cross member 20 toward a vehicle body upward and forward direction also is suppressed.

Further, the upper front joined portions 72 of the cross portions 36, which are joined to the outer surface of the front wall 20F of the front cross member 20, overlap, in the vehicle body vertical direction, with the upper front connected portion 52A of the first inclined wall 52 that is connected to the inner surface of the front wall 20F. Namely, the upper front joined portions 72 of the cross portions 36 are disposed at substantially the same height position as the upper front connected portion 52A whose rigidity is improved by the first inclined wall 52.

Accordingly, as compared with a structure in which the upper front joined portions 72 of the cross portions 36 do not overlap with the upper front connected portion 52A of the first inclined wall 52 in the vehicle body vertical direction, at the time when vibrations from the power unit (the power unit includes the engine) are transmitted to at least the length direction (i.e., extension direction) substantially central portion of the top wall 20U of the front cross member 20, for example, at the time when the load F that is directed toward a vehicle body upward and forward direction is inputted, the upper front joined portions 72 of the cross portions 36 separating from the outer surface of the front wall 20F can be suppressed or prevented.

Similarly, the lower rear joined portions 74 of the cross portions 36, which are joined to the outer surface of the rear wall 20B of the front cross member 20, overlap, in the vehicle body vertical direction, with the lower rear connected portion 54A of the second inclined wall 54 that is connected to the inner surface of the rear wall 20B. Namely, the lower rear joined portions 74 of the cross portions 36 are disposed at substantially the same height positions as the lower rear connected portion 54A whose rigidity is improved by the second inclined wall 54.

Accordingly, as compared with a structure in which the lower rear joined portions 74 of the cross portions 56 do not overlap with the lower rear connected portion of the second inclined wall 54 in the vehicle body vertical direction, at the time when vibrations from the power unit (the power unit includes the engine) are transmitted to at least the length direction (i.e., extension direction) substantially central portion of the top wall 20U of the front cross member 20, for example, at the time when the load F that is directed toward a vehicle body upward and forward direction is inputted, the lower rear joined portions 74 of the cross portions 36 separating from the outer surface of the rear wall 20B can be suppressed or prevented.

Further, as described above, the front cross member 20 relating to the first embodiment has not only the first inclined wall 52 and the second inclined wall 54, but also the third inclined wall 56, which connects the inner surface of the top wall 20U and the inner surface of the rear wall 20B and forms a closed cross-sectional shape at the upper rear corner portion 66, and the fourth inclined wall 58, which connects the inner surface of the bottom wall 20D and the inner surface of the front wall 20F and forms a closed cross-sectional shape at the lower front corner portion 68, in a cross-section orthogonal to the extension direction of the front cross member 20.

Accordingly, as compared with a structure in which the front cross member 20 does not have the third inclined wall 56 and the fourth inclined wall 58, the rigidities of the upper rear corner portion 66 and the lower front corner portion 68 of the front cross member 20 can be improved. Namely, at the front cross member 20 relating to the first embodiment, the rigidities of the upper front corner portion 62, the lower rear corner portion the upper rear corner portion 66 and the lower front corner portion 68 are improved. Accordingly, even if while the vehicle is stopped, the neutral axis N becomes a rectilinear form that runs along the vehicle body longitudinal direction (i.e., the horizontal direction), the power unit (the power unit includes the engine) can be supported more stably at the front cross member 20.

Further, the plate thickness D1 of the top planar portion 20Ut of the top wall 20U, in which is formed the fastening hole 60 for fastening the engine mount bracket 18, is formed to be thicker than the plate thickness D2 of the upper front corner portion 62 and the upper rear corner portion 66. Accordingly, even though the fastening hole 60 is formed, the rigidity of the top planar portion 20Ut of the top wall 20U can be ensured.

Similarly, the plate thickness D3 of the bottom planar portion 20Dt of the bottom wall 20D, in which the work hole 70 is formed for fastening the engine mount bracket 18 to the top planar portion 20Ut of the top wall 20U, is formed to be thicker than the plate thickness D4 of the lower rear corner portion 64 and the lower front corner portion 68. Accordingly, even though the work hole 70 is formed, the rigidity of the bottom planar portion 20Dt of the bottom wall 20D can be ensured.

Further, the rigidities of the upper front corner portion 62, the upper rear corner portion 66, the lower rear corner portion 64 and the lower front corner portion 68 are improved by the first inclined wall 52, the third inclined wall 56, the second inclined wall 54 and the fourth inclined wall 58. Therefore, the plate thickness D2 of the upper front corner portion 62 and the upper rear corner portion can be formed to be thinner than the plate thickness D1 of the top planar portion 20Ut of the top wall 20U, and the plate thickness D4 of the lower rear corner portion 64 and the lower front corner portion 68 can be formed to be thinner than the plate thickness D3 of the bottom planar portion 20Dt of the bottom wall 20D. Namely, the plate thickness of the front cross member 20 can be reduced to the minimum needed. Accordingly, the weight of the front cross member 28 can be lightened, and, as a result, the weight of the vehicle can be lightened.

Further, because the cross portions 36 of the front body mounts 22 and the front cross member 20 are joined linearly by arc welding, they can be joined together securely, and foreign matter entering therebetween can be suppressed or prevented. Accordingly electrolytic corrosion arising therebetween also can be suppressed or prevented. Note that the same holds for the linear joining by arc welding of the front side rail portions 30 of the front body mounts 22 and the rear side rail portions 50 of the rear cross member 40.

Further, the engine mount bracket 18 and the upper member 42 of the rear cross member 40 are formed by die casting of a light metal material such as an aluminum alloy or the like. Therefore, seat surfaces, bosses and the like for mounting other parts can be formed easily. Namely, the engine mount bracket 18 and the upper member 42 of the rear cross member 40 have high rigidity, and the degrees of freedom in the shapes thereof is high, and a reduction in the number of parts or rationalization of the shapes can be devised.

Further, because there is a structure in which the lower arms are mounted only to the upper member 42 of the rear cross member 40, the supporting rigidity of the suspension member 12 with respect to the lower arms can be improved. Accordingly, noise that is caused by vibrations that are inputted from the front wheels (not shown) or the power unit (the power unit includes the engine) can be suppressed.

SECOND EMBODIMENT

The suspension member 12 relating to a second embodiment is described next. Note that components that are equivalent to those of the above-described first embodiment are denoted by the same reference numerals, and detailed description thereof (including description of operation common thereto) is omitted as appropriate.

As described above, while the vehicle is traveling, the load F that is directed toward a vehicle body upward and forward direction is inputted to at least the length direction (i.e., extension directions substantially central portion of the top wall 20U of the front cross member 20 due to vibrations from the power unit (the power unit includes the engine) being transmitted. In this case, because the upper front corner portion 62 and the lower rear corner portion 64 of the front cross member 20 are further from the neutral axis N than the upper rear corner portion 66 and the lower front corner portion 68, the out-of-plane deformation of the upper front corner portion 62 and the lower rear corner portion 64 is greater than that of the upper rear corner portion 66 and the lower front corner portion 68.

Figure 7:
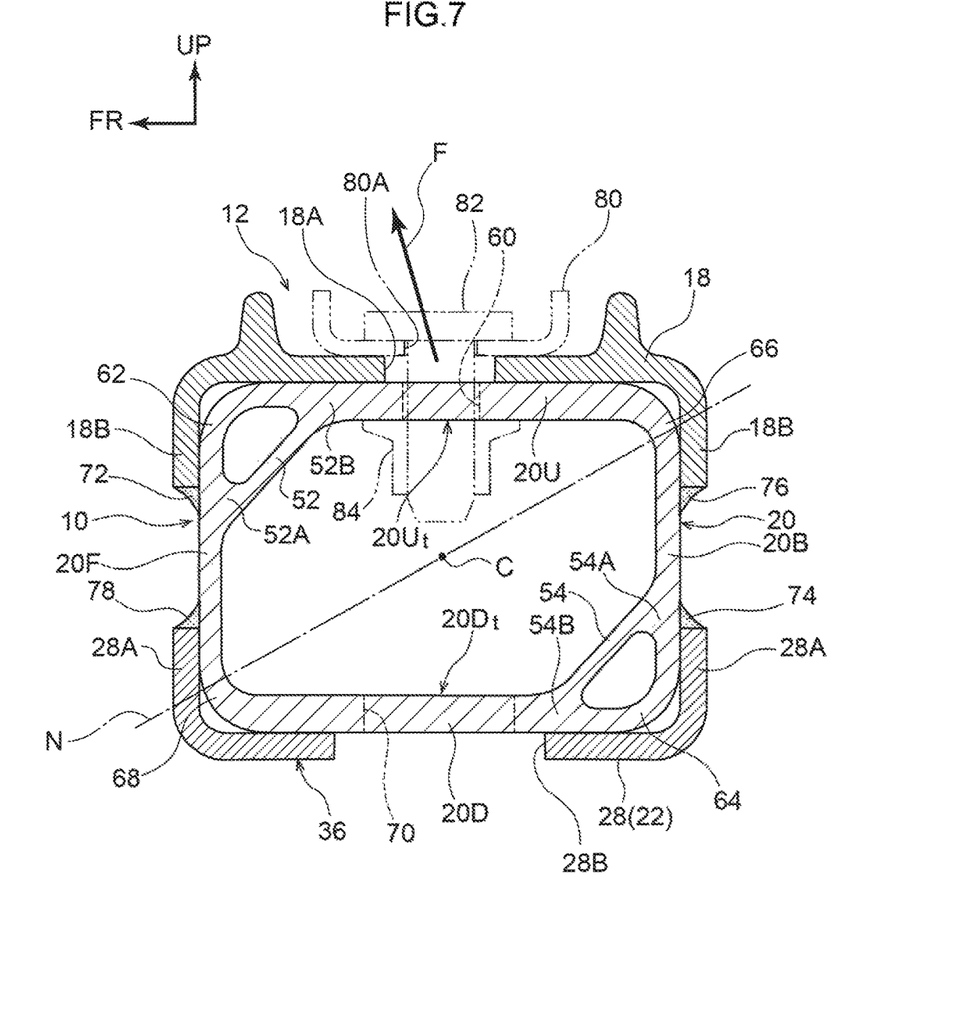
FIG. 7 is a cross-sectional view that corresponds to FIG. 5 and shows the shape of the front cross member relating to a second embodiment.

Accordingly, as shown in FIG. 7, at the front cross member 20 of the second embodiment, only the first inclined wall 52, which connects the inner surface of the top wall 20U and the inner surface of the front wall 20F and forms a closed cross-section shape at the upper front corner portion 62, and the second inclined wall 54, which connects the inner surface of the bottom wall 20D and the inner surface of the rear wall 20B and forms a closed cross-sectional shape at the lower rear corner portion 64, are provided. Namely, the above-described third inclined wall 56 and fourth inclined wall 58 are not provided at the front cross member 20 of the second embodiment.

Accordingly, in the case of the second embodiment, even if the load F that is directed toward a vehicle body upward and forward direction is inputted to at least the length direction (i.e., extension direction) substantially central portion of the top wall 20U of the front cross member 20, out-of-plane deformation of the front cross member 20 in a vehicle body upward and forward direction can be suppressed. Further, as compared with the front cross member 20 of the first embodiment, the weight of the vehicle can be further reduced by an amount corresponding to the amount of not providing the third inclined wall 56 and the fourth inclined wall 58.

Although the suspension member 12 relating to an embodiment has been described above on the basis of the drawings, the suspension member 12 relating to the embodiment is not limited to the illustrated structure, and the design thereof can be changed in various ways within a scope that does not depart from the gist of the present disclosure. For example, the light metal material is not limited to an aluminum alloy, and may be a magnesium alloy or the like.

Further, the front body mount 22 is not limited to a form of being structured by two members that are the upper mount 26 and the lower mount 28. The front body mount 22 may be structured by a single member for example, provided that the front body mount 22 can cover, by the cross portion 36, at least the upper front corner portion 62 and the lower rear corner portion 64 of the front cross member 20.

Namely, the cross portion 36 of the front body mount 22 may be formed in a substantial "C" shape in cross-section that continuously covers the region from the upper front corner portion 62 to the lower rear corner portion 64. Further, the upper mount 26 and the lower mount 28 of the front body mount 22 may be formed by die casting and the rigidity thereof improved.

Further, description has been given in which the front cross member 20 relating to the above-described embodiment is a structure having only the first inclined wall 52 and the second inclined wall 54, or is a structure having the first inclined wall 52, the second inclined wall 54, the third inclined wall 56 and the fourth inclined wall 58. However, the front cross member 20 may be a structure that has only the first inclined wall 52, the second inclined wall 54 and the third inclined wall 56, i.e., a structure in which only the fourth inclined wall 58 is not provided.

Further, the welding that linearly joins the cross portions 36 of the front body mounts 22 and the front cross member 20, and the welding that linearly joins the front side rail portions 30 of the front body mounts 22 and the rear side rail portions 50 of the rear cross member 40, are not limited to arc welding, and may be, for example, laser welding or the like.

Embodiments disclosed herein may be combined with other embodiments in any manner consistent with at least one of the principles disclosed herein.

What is claimed is:

1. A suspension member, comprising:
 a front cross member that has a rectangular closed cross-sectional shape, as seen in a cross-section orthogonal to an extension direction of the front cross member, and that is provided with an engine mount bracket at a top wall of the front cross member,
 wherein the front cross member comprises:
  a first inclined wall that, as seen in the cross-section, connects an inner surface of the top wall and an inner surface of a front wall of the front cross member, and forms a closed cross-sectional shape at an upper front corner portion of the front cross member; and
  a second inclined wall that, as seen in the cross-section, connects an inner surface of a bottom wall and an inner surface of a rear wall of the front cross member, and forms a closed cross-sectional shape at a lower rear corner portion of the front cross member,
 wherein the top wall has a top planar portion, and wherein a plate thickness of the top planar portion is thicker than a plate thickness of the upper front corner portion.

2. The suspension member of claim 1, wherein a fastening hole for fastening the engine mount bracket is formed in the top planar portion.

3. The suspension member of claim 2, wherein:
the bottom wall has a bottom planar portion in which a work hole for fastening the engine mount bracket to the top planar portion is formed, and
a plate thickness of the bottom planar portion is thicker than a plate thickness of the lower rear corner portion.

4. The suspension member of claim 1, wherein the front cross member further comprises:
a third inclined wall that, as seen in the cross-section, connects the inner surface of the top wall and the inner surface of the rear wall, and forms a closed cross-sectional shape at an upper rear corner portion of the front cross member; and
a fourth inclined wall that, as seen in the cross-section, connects the inner surface of the bottom wall and the inner surface of the front wall, and forms a closed cross-sectional shape at a lower front corner portion of the front cross member.

5. The suspension member of claim 1, wherein:
cross portions, which extend toward a vehicle transverse direction inner side, of front body mounts are joined to both extension direction end portions of the front cross member, and
as seen in the cross-section, at least the upper front corner portion and the lower rear corner portion are covered by the cross portions.

6. The suspension member of claim 5, wherein upper front joined portions of the cross portions that are joined to an outer surface of the front wall overlap, in a vehicle body vertical direction, with an upper front connected portion of the first inclined wall that is connected to the inner surface of the front wall.

7. The suspension member of claim 5, wherein lower rear joined portions of the cross portions that are joined to an outer surface of the rear wall overlap, in a vehicle body vertical direction, with a lower rear connected portion of the second inclined wall that is connected to the inner surface of the rear wall.

8. A suspension member, comprising:
a front cross member that has a rectangular closed cross-sectional shape, as seen in a cross-section orthogonal to an extension direction of the front cross member, and that is provided with an engine mount bracket at a top wall of the front cross member,
wherein the front cross member comprises:
a first inclined wall that, as seen in the cross-section, connects an inner surface of the top wall and an inner surface of a front wall of the front cross member, and forms a closed cross-sectional shape at an upper front corner portion of the front cross member; and
a second inclined wall that, as seen in the cross-section, connects an inner surface of a bottom wall and an inner surface of a rear wall of the front cross member, and forms a closed cross-sectional shape at a lower rear corner portion of the front cross member,
wherein the top wall has a top planar portion in which a fastening hole for fastening the engine mount bracket is formed, and
wherein a plate thickness of the top planar portion is thicker than a plate thickness of the upper front corner portion.

9. The suspension member of claim 8, wherein:
the bottom wall has a bottom planar portion in which a work hole for fastening the engine mount bracket to the top planar portion is formed, and
a plate thickness of the bottom planar portion is thicker than a plate thickness of the lower rear corner portion.

10. The suspension member of claim 8, wherein the front cross member further comprises:
a third inclined wall that, as seen in the cross-section, connects the inner surface of the top wall and the inner surface of the rear wall, and forms a closed cross-sectional shape at an upper rear corner portion of the front cross member; and
a fourth inclined wall that, as seen in the cross-section, connects the inner surface of the bottom wall and the inner surface of the front wall, and forms a closed cross-sectional shape at a lower front corner portion of the front cross member.

11. The suspension member of claim 8, wherein:
cross portions, which extend toward a vehicle transverse direction inner side, of front body mounts are joined to both extension direction end portions of the front cross member, and
as seen in the cross-section, at least the upper front corner portion and the lower rear corner portion are covered by the cross portions.

12. The suspension member of claim 11, wherein upper front joined portions of the cross portions that are joined to an outer surface of the front wall overlap, in a vehicle body vertical direction, with an upper front connected portion of the first inclined wall that is connected to the inner surface of the front wall.

13. The suspension member of claim 11, wherein lower rear joined portions of the cross portions that are joined to an outer surface of the rear wall overlap, in a vehicle body vertical direction, with a lower rear connected portion of the second inclined wall that is connected to the inner surface of the rear wall.

14. A suspension member, comprising:
a front cross member that has a rectangular closed cross-sectional shape, as seen in a cross-section orthogonal to an extension direction of the front cross member, and that is provided with an engine mount bracket at a top wall of the front cross member,
wherein the front cross member comprises:
a first inclined wall that, as seen in the cross-section, connects an inner surface of the top wall and an inner surface of a front wall of the front cross member, and forms a closed cross-sectional shape at an upper front corner portion of the front cross member; and
a second inclined wall that, as seen in the cross-section, connects an inner surface of a bottom wall and an inner surface of a rear wall of the front cross member, and forms a closed cross-sectional shape at a lower rear corner portion of the front cross member,
wherein cross portions, which extend toward a vehicle transverse direction inner side, of front body mounts are joined to both extension direction end portions of the front cross member, and
wherein, as seen in the cross-section, at least the upper front corner portion and the lower rear corner portion are covered by the cross portions.

15. The suspension member of claim 14, wherein the front cross member further comprises:
a third inclined wall that, as seen in the cross-section, connects the inner surface of the top wall and the inner surface of the rear wall, and forms a closed cross-sectional shape at an upper rear corner portion of the front cross member; and a fourth inclined wall that, as seen in the cross-section, connects the inner surface of the bottom wall and the inner surface of the front wall, and forms a closed cross-sectional shape at a lower front corner portion of the front cross member.

16. The suspension member of claim 14, wherein upper front joined portions of the cross portions that are joined to an outer surface of the front wall overlap, in a vehicle body vertical direction, with an upper front connected portion of the first inclined wall that is connected to the inner surface of the front wall.

17. The suspension member of claim 14, wherein lower rear joined portions of the cross portions that are joined to an outer surface of the rear wall overlap, in a vehicle body vertical direction, with a lower rear connected portion of the second inclined wall that is connected to the inner surface of the rear wall.

\* \* \* \* \*